Patented Mar. 11, 1941

2,234,703

UNITED STATES PATENT OFFICE 2,234,703

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application June 24, 1938,
Serial No. 215,638

11 Claims. (Cl. 8—50)

This invention relates to new aryl azo compounds and their application to the art of dyeing or coloring. More particularly, the invention relates to aryl monoazo dye compounds characterized in that they contain an acetal group linked to the aryl dye nucleus through a nitrogen atom which is a nuclear substituent of the aryl dye nucleus and the application of the nuclear non-sulfonated azo dye compounds of the invention to the coloration of organic derivatives of cellulose.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate, or cellulose butyrate, and the hydrolyzed as well as the unhydrolyzed mixed organic acid esters of cellulose, such as cellulose acetate propionate, cellulose acetate-butyrate, and the cellulose ethers, such as methyl cellulose, ethyl cellulose or benzyl cellulose.

The aryl azo dye compounds of our invention have the general formula:

$$R-N=N-R_1$$

wherein R represents the residue of an aryl nucleus and $R_1$ represents a member selected from the group consisting of a phenyl residue and a naphthalene residue containing an acetal group linked to the nucleus through a nitrogen atom which is a nuclear substituent of said member. Advantageously R and $R_1$ are phenyl nuclei.

In order that our invention may be clearly understood, it will be noted that the expression "an acetal group" includes not only the acetal group

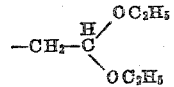

but also modified acetal groups such as:

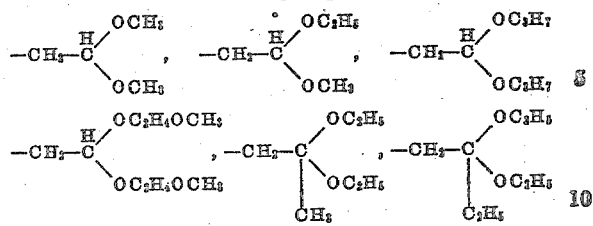

and

for example.

The last three groups just given, strictly speaking, are probably more properly referred to as ketal groups. The expression "an acetal group," if a restricted meaning is applied thereto, probably does not include a ketal group although it is not uncommon to regard ketal as subgeneric to acetal. That this is so is readily apparent from the fact that the term ketal is defined by Webster's New International Dictionary—Unabridged—2nd ed.—1935, as "Chem. An acetal derived from a ketone, of the general formula

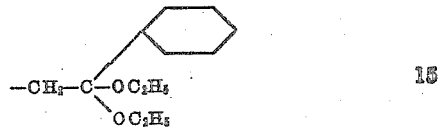

For the purpose of the present invention, since the ketal group may be employed in the preparation of azo dye compounds suitable for the dyeing or coloration of organic derivatives of cellulose, it will be understood that the expression "an acetal group" is generic to ketal groups.

The nuclear non-sulfonated aryl azo dye compounds of our invention constitute valuable dyes for the coloration of organic derivatives of cellulose yielding shades ranging from blue green to purple and from yellow to red. These compounds similarly possess application for the coloration of wool and silk and yield the same or generally similar shades thereon. Compounds of the above general formula which contain a nuclear sulfonic acid group can likewise be prepared in known fashion. These compounds possess little or no utility for the coloration of organic derivatives of cellulose but can be employed to color textile materials such as silk and wool. For the dyeing of organic derivatives of cellulose, such as cellulose acetate silk, nuclear non-sulfonated compounds wherein $R_1$ is a phenyl residue are generally considerably more light fast than those compounds wherein $R_1$ is a naphthalene residue.

The aryl azo dye compounds of our invention can be conveniently prepared by diazotizing an arylamine and coupling the diazonium compound resulting with a phenyl or naphthalene coupling component containing an acetal group linked to its nucleus through a nitrogen atom which is a nuclear substituent thereof. The phenyl or naphthalene coupling component may be further substituted in its nucleus, as will be more fully apparent hereinafter, but it will be understood that its coupling position must not be blocked.

Arylamines that can be employed in the preparation of the azo compounds of our invention include, for example, aniline, nitro substituted anilines, such as p-nitroaniline and 2,4-dinitroaniline, halogen substituted anilines, such as p-chloroaniline, o-chloro-p-nitroaniline, o-bromoaniline, p-iodoaniline, and 2,4-dichloroaniline, alkyl substituted anilines such as o-methylaniline, p-ethylaniline, o-β-methoxyethylaniline and o-chloro-p-methylaniline, alkoxy substituted anilines, such as p-methoxyaniline, o-β-methoxyethoxyaniline and p-butoxyaniline, keto substituted anilines such as p-aminoacetophenone and p-aminophenyl propyl ketone, sulfonated anilines such as 1-amino-2-sulfonic benzene and 1-amino-2-sulfonic-4-nitrobenzene and naphthylamines such as α-naphthylamine, β-naphthylamine, 1-amino-4-hydroxynaphthalene, 1-amino-2-sulfonic naphthalene, 1-amino-4-nitronaphthalene, and 1-amino-8-hydroxynaphthalene. Further, arylamines such as p-aminobenzophenone, o-aminobenzophenone, p-aminodiphenylamine, and p-aminoazobenzene can be used. As a further illustration of the arylamines which can be employed in the preparation of the azo compounds of our invention reference may be had to our U. S. Patents Nos. 2,107,898 and 2,115,030, issued February 8, 1938, and April 26, 1938, respectively, wherein additional suitable arylamines are disclosed. It will be clearly understood, however, that the arylamines, disclosed herein are given by way of example and are not intended to be limitative of the invention. Any of the arylamines disclosed herein may be diazotized and the diazonium compound resulting coupled with any of the coupling components disclosed herein to obtain dye compounds of the invention.

The coupling components ordinarily employed in the preparation of the azo compounds of our invention may be represented by the general formula:

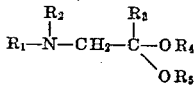

wherein $R_1$ represents a phenyl or naphthalene residue, $R_3$ represents hydrogen, an alkyl group or an aryl group, $R_4$ and $R_5$ each represents an alkyl group and $R_2$ represents hydrogen, an alkyl group, an aryl group, a hydroaryl group, and aralkyl group, and a

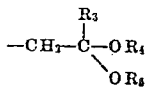

group, wherein $R_3$, $R_4$ and $R_5$ have the meaning previously assigned to them. $R_1$ may be substituted as has been previously indicated.

The following examples illustrate the preparation of the dye compounds of our invention:

*Example 1*

13.8 grams of p-nitroaniline are added to 200 cc. of water to which has been added 30 cc. of 36% hydrochloric acid. The resulting solution is cooled to a temperature approximating 0–5° C. and the amine diazotized, while maintaining this temperature, by the addition, with stirring, of a water solution of 6.9 grams of sodium nitrite.

20.9 grams of the diethyl acetal of phenylaminoacetaldehyde, 10 grams of glacial acetic acid and 200 grams of water are mixed and the diazonium solution prepared above is added, with stirring. During the coupling reaction which takes place, sodium acetate is added from time to time to keep the reaction mixture neutral to Congo red paper. Upon completion of the coupling reaction, the dye compound formed is precipitated by the addition of water, recovered by filtration, washed with water and dried. The dye compound formed has the formula:

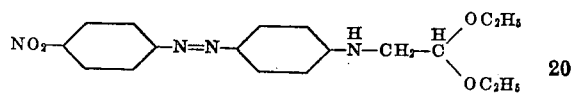

and colors cellulose acetate silk an orange shade of good fastness to light and washing. Wool and silk are likewise colored an orange shade by this dye compound.

By the substitution of 22.3 grams of the diethyl acetal of methylphenylaminoacetaldehyde for the diethyl acetal of phenylaminoacetaldehyde of the example, the dye compound having the formula:

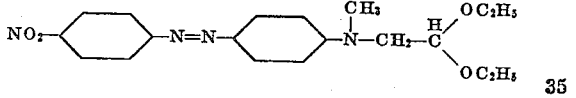

can be obtained. This compound yields a reddish shade on cellulose acetate silk.

*Example 2*

13.5 grams of p-aminoacetophenone are diazotized in the usual manner and coupled with 23.7 grams of the diethyl acetal of ethylphenylaminoacetaldehyde. The dye compound formed which may be recovered in accordance with the method described in Example 1 has the general formula:

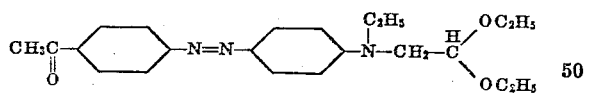

and colors cellulose acetate silk an orange shade of good fastness to light and washing.

*Example 3*

18.3 grams of 1-amino-2,4-dinitrobenzene are diazotized and coupled with 31.9 grams of the di-β-methoxyethyl acetal of α-naphthylamine. The dye compound obtained has the formula:

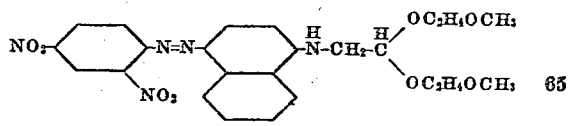

and colors cellulose acetate silk a reddish purple shade.

*Example 4*

26.2 grams of 1-amino-2,4-dinitro-6-bromobenzene are diazotized and the diazonium compound formed is coupled with 33.2 grams of the di-β-methoxyethyl acetal of methyl-α-naphthylamine. The dye compound formed has the formula:

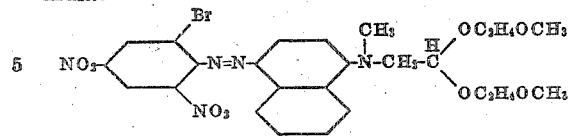

and colors cellulose acetate silk a blue shade.

The following tabulation further illustrates the compounds of our invention together with the color they produce on cellulose acetate silk. The compounds indicated below may be prepared by diazotizing the amines listed under the heading "Amine" and coupling the diazonium compounds formed with the compounds specified in the column entitled "Coupling component."

| Amine | Coupling component | Color on cellulose acetate silk |
|---|---|---|
| 1-amino-4-chlorobenzene | (1) Diethyl acetal of phenylaminoacetaldehyde | Yellow. |
| Do | (2) Diethyl acetal of methylphenylaminoacetaldehyde | Do. |
| Do | (3) Dimethyl acetal of phenylaminoacetaldehyde | Do. |
| Do | (4) Di-β-methoxyethyl acetal of phenylaminoacetaldehyde | Do. |
| Do | (5) Methyl ethyl acetal of 2-methoxy-5-methylphenylaminoacetaldehyde | Do. |
| Do | (6) Diethyl acetal of 3-chloro-ethylphenylaminoacetaldehyde | Do. |
| Do | (7) Diethyl acetal of 3-methyl-β-hydroxyethylphenylaminoacetaldehyde | Do. |
| Do | (8) Di-β-methoxyethyl acetal of α-naphthylaminoacetaldehyde | Do. |
| Do | (9) Di-β-methoxyethyl acetal of ethyl-α-naphthylaminoacetaldehyde | Orange-yellow. |
| Do | (10) Di-β-methoxyethyl acetal of β-hydroxyethyl-α-naphthylaminoacetaldehyde | Do. |

| Amine | Coupling component | Color on cellulose acetate silk |
|---|---|---|
| 1-amino-4-chlorobenzene | (11) Diethyl acetal of α-naphthyl-aminoacetaldehyde | Orange-yellow. |
| Do | (12) Diethyl ketal of 3-methoxyphenylaminoacetone | Yellow. |
| Do | (13) Diethyl ketal of ω-phenylaminoacetophenone | Do. |
| Do | (14) Diethyl acetal of 8-hydroxy-α-naphthylamine | Orange. |
| Do | (15) Diethyl acetal of 2,5-dimethoxy-benzylphenylaminoacet aldehyde | Yellow. |
| Do | (16) Diethyl acetal of diphenylaminoacetaldehyde | Do. |
| Do | (17) Diethyl acetal of cyclohexylphenylaminoacetaldehyde | Do. |
| Do | (18) | Do. |
| p-Aminoacetophenone | 1 to 18 above | Orange to red. |
| p-Nitroaniline | do | Orange to blue. |
| p-Nitro-o-bromoaniline | do | Red to blue. |
| 2,4-dinitroaniline | do | Rubine to green-blue. |
| 2,4-dinitro-6-bromoaniline | do | Do. |
| 2,4-dinitro-6-chloroaniline | do | Do. |
| 2,4,6-trinitroaniline | do | Do. |
| 1-amino-2-nitro-4-acetobenzene | do | Orange to green-blue. |
| 4-nitro-2-hydroxyaniline | do | Pink to blue. |
| p-Aminoazobenzene | do | Orange to blue. |

The coupling components employed in the preparation of the azo dye compounds of our invention offer little or no difficulty as regards their preparation and may be prepared in any suitable manner. Compounds of the general formula:

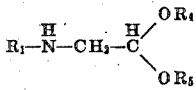

wherein $R_1$ is a phenyl or naphthyl nucleus and $R_4$ and $R_5$ each represents an alkyl group can be prepared by reacting a compound having the general formula $R_1NH_2$ wherein $R_1$ represents a phenyl or naphthyl nucleus with a compound having the general formula

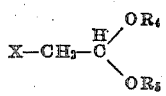

wherein X is a halogen atom such as chlorine or bromine and $R_4$ and $R_5$ each represents an alkyl group. Acetals of the above formula but wherein $R_4$ is an alkyl group and $R_5$ is an alkoxy-alkyl group are the invention of J. B. Dickey and J. B. Normington and are described and claimed in their application Serial No. 213,027, filed June 10, 1938.

The hydrogen atom attached to the nitrogen atom of the above coupling components may be replaced with an alkyl group, an aryl group, a hydroaryl or an aralkyl group, for example, by methods known for the introduction of such substituent groups. Similarly, said hydrogen atom may be replaced by a

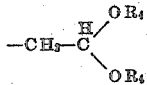

group, by the use of two instead of one mole parts of

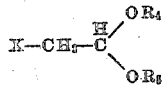

in the reaction just set forth.

Coupling compounds having the formula:

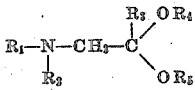

wherein $R_1$ is a phenyl or naphthyl nucleus, $R_2$ is hydrogen, alkyl, aryl, hydroaryl or aralkyl, $R_3$ is alkyl or aryl and $R_4$ and $R_5$ each represent alkyl, can be prepared by treating an arylamine having the general formula:

with a compound having the general formula:

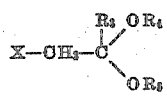

wherein X represents a halogen atom and $R_3$, $R_4$ and $R_5$ have the meaning previously assigned to them, in the presence of a suitable alkali such as sodium hydroxide, sodium carbonate, sodium bicarbonate or sodium acetate, for example. The salt formed during the reaction is removed following which the reaction product can be obtained by fractional distillation under reduced pressure.

The following example illustrates the preparation of a coupling component suitable for use in the preparation of the azo compounds of our invention.

*Preparation of the diethylacetal of ethylphenyl-aminoacetaldehyde*

121 grams of ethylaniline are placed in a flask with 100 grams of anhydrous sodium bicarbonate. The mixture resulting is heated with stirring to a temperature of 120–130° C. and then 243 grams of bromoacetal are added dropwise. Upon completion of the reaction which takes place, the reaction product is removed by extraction with alcohol and following removal of the alcohol by evaporation, for example, the reaction product is distilled under reduced pressure to give a good yield of the desired compound.

By the substitution of aniline for ethylaniline and

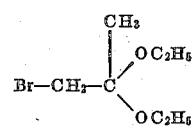

for bromoacetal in the above reaction, the ketal compound,

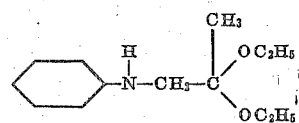

can be prepared.

The azo dye compounds of our invention are, for the most part, relatively insoluble in water. Those compounds, which are insoluble in water, may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of our invention which are water soluble do not, of course, require the use of a dispersing or solubilizing agent but may be applied to silk, wool and (depending on the nature and position of the water solubilizing group) organic derivatives of cellulose textile materials from an aqueous solution of the dye which may contain salt. For a more complete description as to how the azo dye compounds of our invention may be employed in dyeing or coloring operations, reference may be had to our United States Letters Patent No. 2,115,030, issued April 26, 1938.

We claim:
1. The azo dye compounds having the general formula:

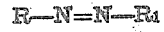

wherein R represents the residue of a member selected from the group consisting of an aryl nucleus of the benzene series, an aryl nucleus of the naphthalene series and an azo benzene nucleus and $R_1$ represents a member selected from the group consisting of a phenyl nucleus and a naphthyl nucleus said member containing an acetal group linked to its nucleus through an amino nitrogen atom which is a nuclear substituent of the said member and which is in para position to the azo bond.

2. The azo dye compounds having the general formula:

$$R\!-\!N\!=\!N\!-\!R_1$$

wherein R represents the residue of a member selected from the group consisting of an aryl nucleus of the benzene series, an aryl nucleus of the naphthalene series and an azo benzene nucleus and $R_1$ represents a member selected from the group consisting of a phenyl nucleus and a naphthyl nucleus said member containing a

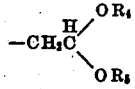

group, wherein $R_4$ and $R_5$ each represents an alkyl group, linked to its nucleus through an amino nitrogen atom which is a nuclear substituent of the said member and which is in para position to the azo bond.

3. The monoazo dye compounds having the general formula:

$$R\!-\!N\!=\!N\!-\!R_1$$

wherein R represents the residue of a phenyl nucleus and $R_1$ represents a phenyl nucleus containing an acetal group linked to its nucleus through an amino nitrogen atom which is a nuclear substituent of said phenyl nucleus and which is in para position to the azo bond.

4. The monoazo dye compounds having the general formula:

$$R\!-\!N\!=\!N\!-\!R_1$$

wherein R represents the residue of a phenyl nucleus and $R_1$ represents a phenyl nucleus containing a

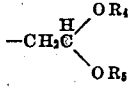

group, wherein $R_4$ and $R_5$ each represents an alkyl group, attached to its nucleus through an amino nitrogen atom which is a nuclear substituent of said phenyl nucleus and which is in a para position to the azo bond.

5. The process of coloring an organic derivative of cellulose which comprises applying thereto a nuclear non-sulfonated aryl monoazo dye compound having the general formula:

$$R\!-\!N\!=\!N\!-\!R_1$$

wherein R represents the residue of a phenyl nucleus and $R_1$ represents a phenyl nucleus containing an acetal group linked to its nucleus through an amino nitrogen atom which is a nuclear substituent of said phenyl nucleus and which is in para position to the azo bond.

6. The process of coloring an organic derivative of cellulose which comprises applying thereto a nuclear non-sulfonated aryl monoazo dye compound having the general formula:

$$R\!-\!N\!=\!N\!-\!R_1$$

wherein R represents the residue of a phenyl nucleus and $R_1$ represents a phenyl nucleus containing a

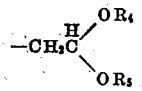

group, wherein $R_4$ and $R_5$ each represents an alkyl group, attached to its nucleus through an amino nitrogen atom which is a nuclear substituent of said phenyl nucleus and which is in a para position to the azo bond.

7. The process of coloring an organic acid ester of cellulose which comprises applying thereto a nuclear non-sulfonated aryl monoazo dye compound having the general formula:

$$R\!-\!N\!=\!N\!-\!R_1$$

wherein R represents the residue of a phenyl nucleus and $R_1$ represents a phenyl nucleus containing an acetal group linked to its nucleus through an amino nitrogen atom which is a nuclear substituent of said phenyl nucleus and which is in para position to the azo bond.

8. The process of coloring a cellulose acetate which comprises applying thereto a nuclear non-sulfonated aryl monoazo dye compound having the general formula:

$$R\!-\!N\!=\!N\!-\!R_1$$

wherein R represents the residue of a phenyl nucleus and $R_1$ represents a phenyl nucleus containing a

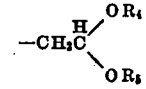

group, wherein $R_4$ and $R_5$ each represents an alkyl group, attached to its nucleus through an amino nitrogen atom which is a nuclear substituent of said phenyl nucleus and which is in a para position to the azo bond.

9. Material made of or containing an organic derivative of cellulose and in which said organic derivative of cellulose is colored with a nuclear non-sulfonated aryl azo dye compound having the general formula:

$$R\!-\!N\!=\!N\!-\!R_1$$

wherein R represents the residue of a member selected from the group consisting of an aryl nucleus of the benzene series, an aryl nucleus of the naphthalene series and an azo benzene nucleus and $R_1$ represents a member selected from the group consisting of a phenyl nucleus and a naphthyl nucleus said member containing an acetal group linked to its nucleus through an amino nitrogen atom which is a nuclear substituent of the said member and which is in para position to the azo bond.

10. A cellulose acetate colored with a nuclear non-sulfonated aryl azo dye compound having the general formula:

$$R\!-\!N\!=\!N\!-\!R_1$$

wherein R represents the residue of a member selected from the group consisting of an aryl nucleus of the benzene series, an aryl nucleus of the naphthalene series and an azo benzene nucleus and $R_1$ represents a member selected from the group consisting of a phenyl nucleus and a naphthyl nucleus said member containing an acetal group linked to its nucleus through an amino nitrogen atom which is a nuclear substituent of the said member and which is in para position to the azo bond.

11. A cellulose acetate colored with a nuclear non-sulfonated aryl monoazo dye compound having the general formula:

$$R\!-\!N\!=\!N\!-\!R_1$$

wherein R represents the residue of a phenyl nucleus and $R_1$ represents a phenyl nucleus containing an acetal group linked to its nucleus through an amino nitrogen atom which is a nuclear substituent of said phenyl nucleus and which is in para position to the azo bond.

JAMES G. McNALLY.
JOSEPH B. DICKEY.